(No Model.)
J. J. McTIGHE.
MANUFACTURE OF HARD CARBON.
No. 338,542. Patented Mar. 23, 1886.
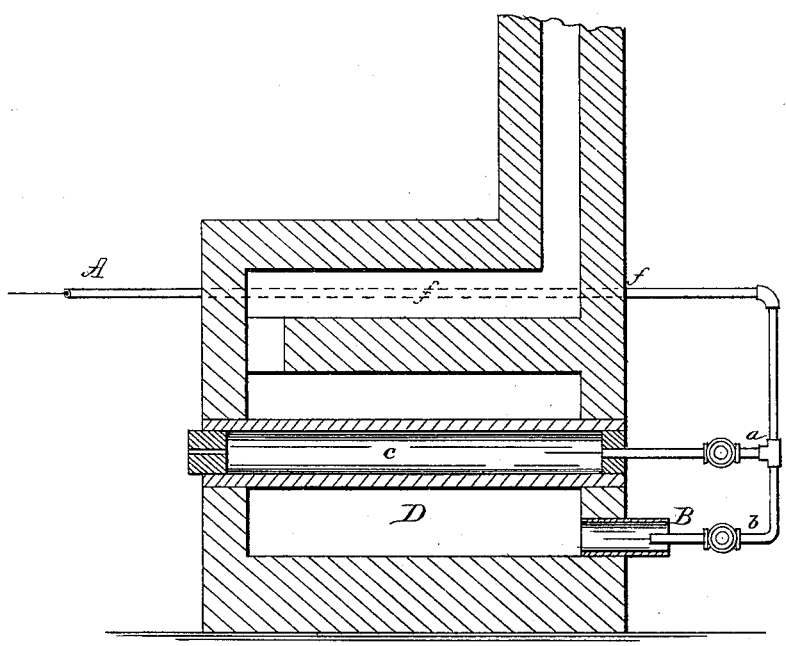
Witnesses:—
G. Smith.
T. J. Patterson
James J. McTighe
Inventor
by Connolly Bros. & McTighe
Attorneys.

UNITED STATES PATENT OFFICE.

JAMES J. McTIGHE, OF PITTSBURG, PENNSYLVANIA.

MANUFACTURE OF HARD CARBON.

SPECIFICATION forming part of Letters Patent No. 338,542, dated March 23, 1886.

Application filed August 24, 1883. Serial No. 104,628. (No model.)

*To all whom it may concern:*

Be it known that I, JAMES J. MCTIGHE, of Pittsburg, in the county of Allegheny and State of Pennsylvania, have invented certain new and useful Improvements in the Manufacture of Hard Carbon; and I do hereby declare that the following is a full, clear, and exact description of the invention, which will enable others skilled in the art to which it appertains to make and use the same, reference being had to the accompanying drawing, which forms a part of this specification, in which the figure is a sectional elevation of a furnace and attachments adapted to the practice of my invention.

This invention relates to the manufacture of hard carbon from the so-called "natural gas." This substance is obtained in large quantities in certain parts of this country, and is chiefly utilized at present for consumption in furnaces in various industries. I have discovered that by treatment of this gas in the manner hereinafter explained a dense hard carbon or coke is obtained, which in chemical constitution, in physical structure and characteristics, in appearance of surface and fracture, and in fitness for certain industrial uses differs essentially from any and all other forms or varieties of carbon known to me, and is readily distinguishable therefrom. This product is eminently useful for metallurgical purposes, and, in fact, wherever hardness, purity, fine texture, and uniform density are desired. It has, moreover, properties that render it particularly suitable for use in the manufacture of carbon pencils or electrodes for electric lights. This substance has never been produced and never existed prior to my invention, so far as I am aware.

It is well known that deposits of hard carbon in retorts is an incident in the manufacture of illuminating-gas, and that this gas-retort carbon has been utilized commercially in various ways. It is found in the retorts in masses containing a large proportion of sulphur and ash. It is largely graphitic, presents a metallic luster at fracture, and is mottled in appearance. Generally it can be readily ignited and burns accompanied with flame. It has also been proposed heretofore to line a white-hot retort with a deposit of carbon by the decomposition therein of hydrocarbon gas, such as produced from the distillation of a mineral oil or other hydrocarbon liquid. Such deposit possesses the properties and appearance of graphite, being hard, brittle, lustrous both in surface and fracture, and when pulverized has no adhesive properties or "tooth."

The natural-gas hard carbon produced according to the herein-described process has a fine smooth surface, and is almost black in color. It is free from impurities, and presents a velvety fracture. In fine, it differs radically from either of the carbons above mentioned, and is readily distinguishable therefrom by appearance alone. The specific gravity of the substance is ordinarily about 1.6, sometimes more and sometimes less, depending apparently on the temperature used. When pulverized, this carbon exhibits adhesive properties, enabling it to be easily made into electrodes and the like. It is comparatively a good conductor of electricity, and therefore when used in electric lighting it introduces a relatively small resistance into the circuit—a very important economical consideration. It is more particularly adapted for the manufacture of pencils for arc lights, owing to the property it possesses of slow combustion, burning only under intense heat and unaccompanied by flame. This property is doubtless due to the absence of occluded gases.

With reference to the natural gas from which this substance is produced, it may be stated that analysis shows the following to be its average chemical composition: carbonic acid, six-tenths per cent.; carbonic oxide, six-tenths per cent.; oxygen, eight-tenths per cent.; olefiant gas, one per cent; ethylic hydride, five per cent.; marsh gas, sixty-seven per cent.; hydrogen, twenty-two per cent.; nitrogen, three per cent.; total, one hundred per cent.

From examination of standard chemical works it will be seen that this is an essentially different gas from that produced from coal, oil, or any of the liquid hydrocarbons.

The mode of treatment of this gas for the purposes of my invention consists, briefly, in taking natural gas and decomposing it by heat, and precipitating the nascent molecules of carbon into a solid agglomerate.

In the drawing I illustrate a simple apparatus for the production of the solid agglomerated carbon, as above.

A designates the delivery-pipe of the gas-well, having the two branches $a$ $b$. Branch $b$ leads to a burner, B, adapted under the pressure of the gas to draw in a proper supply of air for its combustion. Branch $a$ connects with a pipe, $c$, of refractory clay, set into the furnace D, into which is delivered the heat generated by burner B. The latter being ignited, soon raises the furnace and pipe $c$ to a sufficient degree of heat, (say to a white heat,) and the gas which enters therein from branch $a$ becomes heated to such a degree that its components, carbon and hydrogen, are disassociated. The carbon thus freed is in a nascent condition and consolidates into a solid agglomerate mass, which has the appearance and properties above set forth. Before consolidating, the carbon, when freed, assumes its own separate molecular condition, the heat renders the molecules incandescent, and in this condition they consolidate into a hard amorphous mass, having none of the porosity of the coal coke, and being consequently denser and heavier. The decomposition is facilitated by heating the gas to a degree insufficient for decomposition previously to its entering the pipe $c$. This may be done by passing it through one or more pipes, $f$, located alongside the flue, where the heat is less intense, as shown. The pipe $c$ should be provided with a small exit-pipe for the escape of the free hydrogen and undecomposed natural gas. Coke or hard carbon can thus be produced plentifully and very cheaply.

No claim is made herein to the apparatus shown and described, as this forms the subject-matter of another application. I have also made a separate application for a carbon pencil or electrode for electric lighting, made of the natural-gas hard carbon herein described.

Having thus fully described my said invention and the manner in which the same is or may be carried into effect, what I claim, and desire to secure by Letters Patent, is—

1. In the art of manufacturing coke or hard carbon, the improvement consisting in decomposing in a closed vessel by external heat the natural gas having substantially the chemical composition described, and maintaining said heat until the carbon is deposited, as set forth.

2. As a new manufacture, the within-described hard dense carbon, distinguished by a nearly black color, velvety surface and fracture, and comparatively high electric conductivity, and possessing the other properties and characteristics set forth.

In testimony that I claim the foregoing as my own I have hereto affixed my signature in presence of two witnesses.

JAMES J. McTIGHE.

Witnesses:
T. J. PATTERSON,
D. E. DAVIS.